J. HERRON & R. T. WRAY.
COKE OVEN DOOR AND FRAME THEREFOR.
No. 10,484. Reissued June 3, 1884.
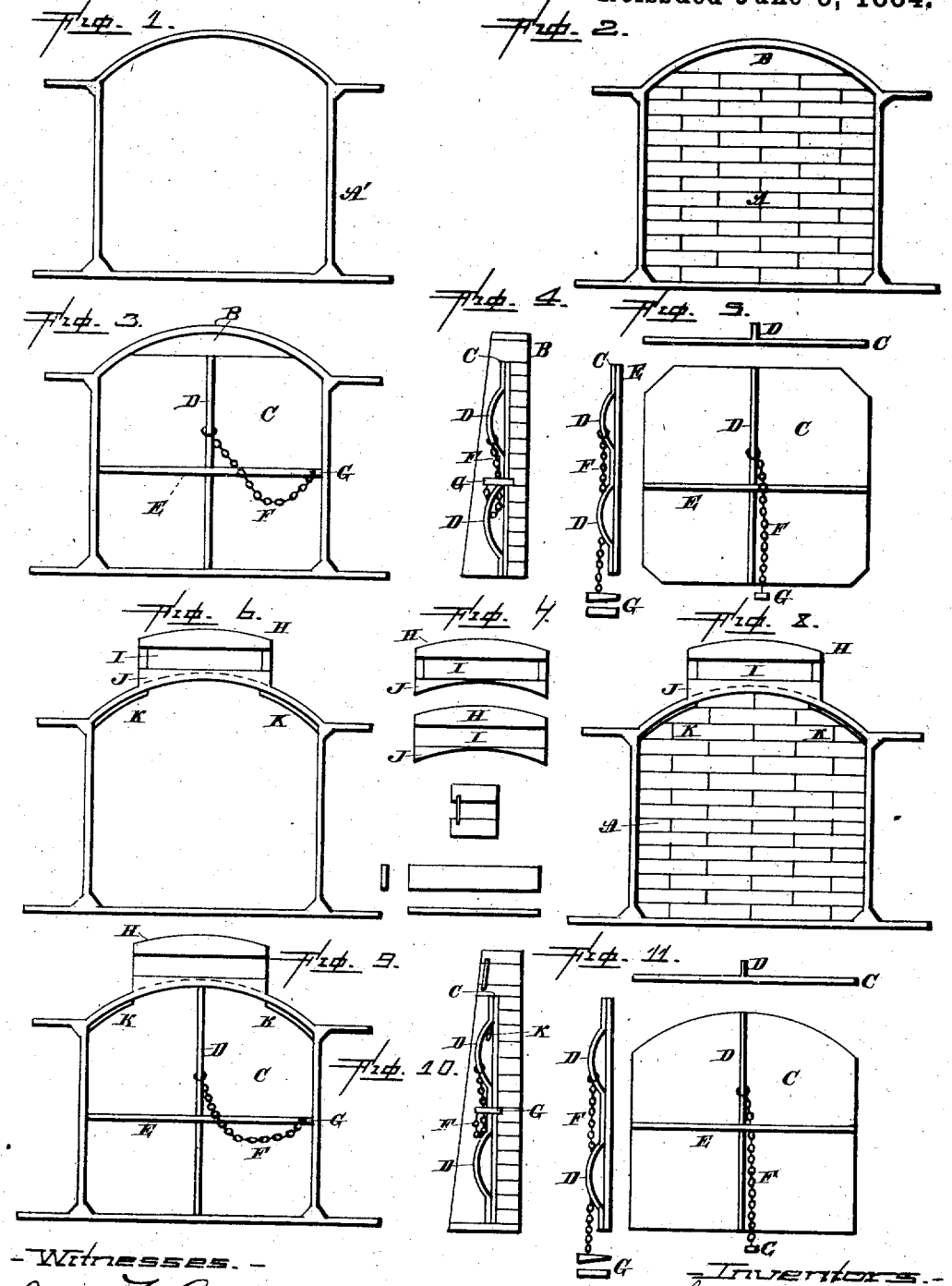
Witnesses.
Louis F. Gardner
J. W. Garner
Inventors.
Jno. Herron,
R. T. Wray,
per
F. A. Lehmann, atty.

UNITED STATES PATENT OFFICE.

JOHN HERRON AND ROBERT T. WRAY, OF DUNBAR, PENNSYLVANIA.

COKE-OVEN DOOR AND FRAME THEREFOR.

SPECIFICATION forming part of Reissued Letters Patent No. 10,484, dated June 3, 1884.

Original No. 287,285, dated October 23, 1883. Application for reissue filed April 1, 1884.

*To all whom it may concern:*

Be it known that we, JOHN HERRON and ROBERT T. WRAY, citizens of the United States, residing at Dunbar, in the county of Fayette and State of Pennsylvania, have invented certain new and useful Improvements in Coke-Oven Doors and Frames therefor, of which the following is a specification, reference being had therein to the accompanying drawings.

Our invention relates to an improvement in coke-oven doors and frames therefor; and it consists, first, in the combination of the metal door-frame, brick-work which is built therein to any suitable height, and a movable iron plate or door, which is used in connection with the brick-work for the purpose of closing the mouth of the oven-door; second, the combination of the metal door-frame, a refractory brick-work filling built therein just high enough to leave an air-inlet at the top of the frame; third, the door-frame provided with ribs, a refractory brick filling, and the metallic door or plate, all of which will be more fully described hereinafter.

The object of our invention is to construct and arrange the door so that it can be easily managed and be absolutely fire-proof, and which can be set aside entirely out of the way in leveling the charge of coal or drawing the coke.

Figure 1 represents an ordinary form of door-frame. Fig. 2 represents the same frame without filling or fire-brick. Fig. 3 represents the frame with the removable door in position. Fig. 4 represents a vertical section taken through the door-frame just at the edge of the door. Fig. 5 represents a front and two edge views of the iron plate. Fig. 6 represents the improved door-frame with air-inlet; Fig. 7, detached views of the parts which form the air-inlet separate from the frame. Fig. 8 represents an improved door-frame having the brick filling applied thereto. Fig. 9 represents a similar frame, with the removable iron plate or door in position. Fig. 10 represents a vertical section of Fig. 9. Fig. 11 represents a front view of the iron plate or door as it will be made in connection with the grooved frames shown in Figs. 6, 8, 9, and 10.

A′ represents a metallic door-frame, such as is now in common use in coke-ovens. Inside of this old form of frame, when used, will be built the brick-work A, which will be made of fire-clay or other refractory material. This brick-work will extend just high enough in the frame to leave an air-inlet, B, at the top of the frame for the passage of air into the oven while a charge of coal is being burned. This brick-work serves to protect the door C from being injured by the heat, and enables the mouth of the oven to be closed more readily and securely than can be done in the usual manner. Where the old form of frame A′ is used, the door C will be made to conform thereto, and will only extend up as high as the brick-work, so as not to interfere with the air-inlet B. Secured to the outer side of this door is the vertical rod D, which is bent as shown in Fig. 4, so as to form handles, by means of which the door can be readily handled. Extending across the door, at right-angles to the rod D, is the cross-bar E, which is riveted or otherwise secured to the door, and which serves to brace and strengthen it. Fastened to the door by means of a chain, F, is a wedge, G, which, after the door C has been placed in position, is used to wedge or tighten the door tightly against the brick, and thus prevent all air from entering the oven at any other point than the inlet B.

Where the old frame A′ is not in use, we make a frame (shown in Figs. 6, 8, 9, and 10) which is similar in form, but which is provided with the flanges K on the under side of the arch, for the purpose of catching over the top edge of the door and holding it tightly in place against the brick-work. Upon the top of this frame we form the top arch, H, through which is made an air-inlet, I. The passage of air through this inlet is controlled by the ordinary slide, as shown. Where the frame with the top arch, H, is used, the brick-work is built the entire height of the interior of the frame, as shown in Fig. 8, and the door C is made to close the entire opening in the frame, instead of extending only part of the way up, as shown in Fig. 3.

Having thus described our invention, we claim—

1. The combination of the door-frame with a brick filling which is built therein, the air passage or flue between the top of the filling and the top of the frame, and a removable door or plate, C, substantially as shown.

2. The combination of the metallic frame, the brick filling which is built therein, the metallic door C, and an air-inlet through which the air passes into the oven, substantially as described.

3. The door-frame provided with the flanges K, a refractory brick filling which is built inside of the frame, and the door C, substantially as specified.

In testimony whereof we affix our signatures in presence of two witnesses.

JOHN HERRON.
ROBT. T. WRAY.

Witnesses:
SAMUEL TARR,
W. E. BAKER.